United States Patent [19]

Djiauw et al.

[11] Patent Number: 5,705,556
[45] Date of Patent: Jan. 6, 1998

[54] MODIFIED STYRENIC BLOCK COPOLYMER COMPOUNDS HAVING IMPROVED ELASTIC PERFORMANCE

[75] Inventors: Lie Khong Djiauw; Rodney Ray Pease, both of Houston, Tex.

[73] Assignee: Shell Oil Company, Houston, Tex.

[21] Appl. No.: 731,902

[22] Filed: Oct. 22, 1996

Related U.S. Application Data

[63] Continuation-in-part of Ser. No. 611,112, Mar. 5, 1996, abandoned.

[51] Int. Cl.$^6$ .................... C08L 55/02; C08L 71/12
[52] U.S. Cl. ........................ 524/505; 525/92 D
[58] Field of Search .................. 525/92 D, 133; 524/505

[56] References Cited

U.S. PATENT DOCUMENTS

H1387  12/1994  Hansen et al. ............ 525/92 D
4,772,657  9/1988  Akiyama ................... 525/92 D

*Primary Examiner*—David Buttner

[57] ABSTRACT

An extrudable elastomeric composition for making elastic fibers or films, the composition including an elastomeric block copolymer, a polyphenylene ether, a polyolefin, and a tackifying resin. The composition has excellent stress relaxation at temperatures above 30° C.

10 Claims, No Drawings

MODIFIED STYRENIC BLOCK COPOLYMER COMPOUNDS HAVING IMPROVED ELASTIC PERFORMANCE

This is a continuation-in-part of application Ser. No. 08/611,112, filed Mar. 5, 1996 now abandoned.

FIELD OF THE INVENTION

The present invention relates to extruding of elastomeric polymer compositions, more specifically to such compositions that are extruded as fibers or films.

BACKGROUND OF THE INVENTION

Extrudable elastomeric compositions which can be easily compression molded or melt blown into elastic fibers or films having low stress relaxation, low hysteresis, and high recoverable energy are described in U.S. Pat. Nos. 4,663,220, 4,789,699, 4,970,259, or 5,093,422. The elastomeric fibers or films are useful in making a variety of applications such as diaper waistbands and non-woven fabrics.

Polystyrene-poly(ethylene-butylene)-polystyrene elastomeric block copolymers and polystyrene-poly(ethylene-propylene)-polystyrene elastomeric block copolymers have been blended with other materials such as, for example, polyolefins and tackifying resins to form extrudable elastomeric compositions which can be more easily extruded into elastic fibers or films having improved processing and/or bonding properties. While the additives improve the extrusion properties of the compositions and the processing and/or bonding properties of the elastic fibers or films, such additives have an adverse affect on the elastic properties of the resulting fiber or film, especially at temperatures above 25° C.

The block copolymers are compatible with polyphenylene ethers (PPE), also known as polyphenylene oxides (PPO®), which is high temperature thermoplastic engineering resins. Because of their high glass transition temperatures and poor processability the PPE polymers by themselves are of limited utility. However, PPE is highly miscible in polystyrene and highly miscible in many high impact polystyrenes produced by rubber modification (HIPS). Such blends are lower melting and thus constitute the type of PPE compositions typically employed in commerce. While PPE is a high strength material, it has low impact strength as measured by notch sensitive tests such as notched Izod. The incorporation of the block copolymers into PPE compositions is known to improve the impact properties of the PPE compositions.

It is an object of the present invention to improve the elastic properties of compounds containing one or more of the block copolymers in combination with a polyolefin and a tackifying resin.

SUMMARY OF THE INVENTION

The present invention is an improved polymer composition for extruding fibers or films having excellent stress relaxation at elevated temperatures. The compositions comprise one or more styrenic block copolymers, such as polystyrene-poly(ethylene-butylene)-polystyrene (S-EB-S), polystyrene-poly(ethylene-propylene)-polystyrene (S-EP-S), or polystyrene-poly(ethylene-propylene)-polystyrene-poly(ethylene-propylene) (S-EP-S-EP), a polyolefin, and a polyphenylene ether having an intrinsic viscosity from 0.09 to 0.35 deciliters per gram as measured in chloroform at 25° C. The polyolefin can be a crystalline polyolefin or an elastomeric polyolefin. The remaining components of the composition include tackifying resins.

DETAILED DESCRIPTION OF THE INVENTION

The extrudable elastomeric composition of the present invention is an improvement of the extrudable compositions described in U.S. Pat. Nos. 4,970,259 and 5,093,422 which descriptions are incorporated by reference herein. The known compositions include one or more styrenic block copolymers, typically a polystyrene-poly(ethylene-butylene)-polystyrene (S-EB-S) or a polystyrene-poly(ethylene-propylene)-polystyrene (S-EP-S) elastomeric block copolymer which is produced by hydrogenating a polystyrene-polybutadiene-polystyrene or polystyrene-polyisoprene-polystyrene block copolymer. The extrudable compositions may further comprise a polyolefin and a tackifying resin. The extrudable elastomeric composition may also include an extending oil.

In the present invention, the styrenic block copolymer composition is further combined with a polyphenylene ether in amount of 25 to 200% weight of polystyrene contained in the block copolymers as described below to improve the properties of the total composition.

The styrenic block copolymers have at least two poly (monoalkenyl arene) blocks, preferably two polystyrene blocks, separated by a saturated block of a poly(conjugated diene), preferably a saturated polybutadiene (EB) or a saturated polyisoprene (EP) block. The preferred S-EB-S and S-EP-S block copolymers comprise polystyrene endblocks having a number average molecular weight from 5,000 to 35,000 and saturated polybutadiene or saturated polyisoprene midblocks having a number average molecular weight from 20,000 to 170,000. The saturated polybutadiene blocks preferably have from 35% to 55% 1,2-configuration and the saturated polyisoprene blocks preferably have greater than 85% 1,4-configuration. The total number average molecular weight of the block polymer is preferably from 30,000 to about 250,000 if the polymer has a linear structure. Such block copolymers may have an average polystyrene content from 10% by weight to 35% by weight.

Block copolymers useful in the present invention are available from the Shell Chemical Company and have number average molecular weights of 62,000–85,000 with polystyrene end-blocks each having number average molecular weights of about 5,200–8,000 and polystyrene content of 13 to 22% by weight.

These polymers may be prepared using free-radical, cationic and anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet, or the like.

In general, when solution anionic techniques are used, conjugated diolefin polymers and copolymers of conjugated diolefins and alkenyl aromatic hydrocarbons are prepared by contacting the monomer or monomers to be polymerized simultaneously or sequentially with an organoalkali metal compound in a suitable solvent at a temperature within the range from about −150° C. to about 300° C., preferably at a temperature within the range from about 0° C. to about 100° C. Particularly effective anionic polymerization initiators are organolithium compounds having the general formula:

$$RLi_n$$

wherein R is an aliphatic, cycloaliphatic, aromatic, or alkyl-substituted aromatic hydrocarbon radical having from 1 to about 20 carbon atoms; and n is an integer of 1 to 4.

In addition to sequential techniques to obtain triblocks, tetrablocks, and higher orders of repeating structures, at least anionic initiators can be used to prepare diblocks of polystyrene-polydiene having a reactive ("live") chain end on the diene block which can be reacted through a coupling agent to create, for example, $(S—I)_x Y$ or $(S—B)_x Y$ structures wherein x is an integer from 2 to about 30, Y is a coupling agent, I is isoprene, B is butadiene and greater than 65 percent of S—I or S—B diblocks are chemically attached to the coupling agent. Y usually has a molecular weight which is low compared to the polymers being prepared and can be any of a number of materials known in the art, including halogenated organic compounds; halogenated alkyl silanes; alkoxy silanes; various esters such as alkyl and aryl benzoates, difunctional aliphatic esters such as dialkyl adipates and the like; polyfunctional agents such as divinyl benzene (DVB) and low molecular weight polymers of DVB. Depending on the selected coupling agent the final polymer can be a fully or partially coupled linear triblock polymer (x=2), i.e., S.I.Y.I.S; or branched, radial or star configurations. The coupling agent, being of low molecular weight, does not materially affect the properties of the final polymer. DVB oligomer is commonly used to create star polymers, wherein the number of diene arms can be 7 to 20 or even higher.

It is not required in coupled polymers that the diblock units all be identical. In fact, diverse "living" diblock units can be brought together during the coupling reaction giving a variety of unsymmetrical structures, i.e., the total diblock chain lengths can be different, as well as the sequential block lengths of styrene and diene.

Since the number of S-EB or S-EP polymeric arms in a star polymer can be large, the number average molecular weights of star polymers within the invention can be much larger than those of linear S-EB-S or S-EP-S polymers, i.e., up to 500,000 or higher. Such higher molecular weight polymers have the viscosity of lower molecular weight linear polymers and thus are processable in spite of the high molecular weight.

The styrenic block copolymers must be hydrogenated. In general, the hydrogenation or selective hydrogenation of the polymer may be accomplished using any of the several hydrogenation processes known in the prior art. For example the hydrogenation may be accomplished using methods such as those taught, for example, in U.S. Pat. Nos. 3,494,942; 3,634,594; 3,670,054; 3,700,633; and Re. 27,145, the disclosure of which patents are incorporated herein by reference. The methods known in the prior art and useful in the present invention for hydrogenating polymers containing ethylenic unsaturation and for hydrogenating or selectively hydrogenating polymers containing aromatic and ethylenic unsaturation, involve the use of a suitable catalyst, particularly a catalyst or catalyst precursor comprising an iron group metal atom, particularly nickel or cobalt, and a suitable reducing agent such as an aluminum alkyl.

In general, the hydrogenation will be accomplished in a suitable solvent at a temperature within the range from about 20° C. to about 100° C. and at a hydrogen partial pressure within the range from about 100 psig to about 5,000 psig, preferably about 100 psig to 1,000 psig. Catalyst concentrations within the range from about 10 ppm (wt) to about 500 ppm (wt) of iron group metal based on total solution are generally used and contacting at hydrogenation conditions is generally continued for a period of time within the range from about 60 to about 240 minutes. After the hydrogenation is completed, the hydrogenation catalyst and catalyst residue will, generally, be separated from the polymer.

The PPE resins suitable for use in this invention are commercially available and are produced by techniques well known in the art such as by oxidizing a phenol with an oxygen-containing gas in the presence of a catalyst system comprising a cuprous salt and a tertiary amine. Suitable PPE resins are homo- and copolymers with repeating para-phenylene or substituted para-phenylene units having from 1 to 4 pendent groups which are independently selected from the group consisting of halogen radicals, hydrocarbon radicals, halohydrocarbon radicals having at least two carbon atoms between the halogen atom and the phenol nucleus, hydrocarbonoxy radicals, and halohydrocarbonoxy radicals having at least two carbon atoms between the halogen atom and the phenol nucleus. These resins have an intrinsic viscosity of from 0.09 to 0.35 deciliters per gram as measured in chloroform at 25° C.

Especially preferred for use in the present invention is poly(2,6-dimethyl-1,4-phenylene)ether.

The compositions of the present invention further include from 15 wt % to 55 wt % of one or more polyolefins including crystalline or elastomeric polyolefins. Polyolefins which may be utilized in the extrudable composition must be one which, when blended with the elastomeric block copolymer or a mixture of elastomeric block copolymers and subjected to an appropriate combination of elevated pressure and elevated temperature conditions, is extrudable, in blended form, with the elastomeric block copolymer or a mixture of elastomeric block copolymers. In particular, preferred polyolefin materials include polyethylene, polypropylene, and polybutylene, including ethylene copolymers, propylene copolymers, and butylene copolymers. Blends of two or more of the polyolefins may be utilized.

One particular polyethylene may be obtained from Quantum Chemical, U.S.I. Div., under the trade designation Petrothene NA 601-04 (also referred to herein as PE NA 601). Information obtained from Quantum Chemical states that PE NA 601 is a low molecular weight, low density polyethylene for application in the areas of hot melt adhesives and coatings. Quantum Chemical has also stated that PE NA 601 has the following nominal values: (1) a Brookfield viscosity, cP at 150 degrees Centigrade of 8,500 and at 190 degrees Centigrade of 3,300 when measured in accordance with ASTM D 3236; (2) a density of 0.903 grams per cubic centimeter when measured in accordance with ASTM D 1505; (3) an equivalent Melt index of 2,000 grams per 10 minutes when measured in accordance with ASTM D 1238; (4) a ring and ball softening point of 102 degrees Centigrade when measured in accordance with ASTM E 28; (5) a tensile strength of 850 pounds per square inch when measured in accordance with ASTM D 638; (6) an elongation of 90 percent when measured in accordance with ASTM D 638; (7) a modulus of rigidity, Tf(45,000) of −34 degrees Centigrade; and (8) a penetration hardness (tenths of mm) at 77 degrees Fahrenheit of 3.6.

The polyolefin can also be a metallocene polyolefin having a density from 0.86 to 0.91, a molecular weight distribution less than 3, and a good distribution of ethylene and from 8% to 30% by weight of an α-olefin comonomer having from 4 to 12 carbon atoms, preferably from 4 to 8 carbon atoms. The metallocene polyolefins are polyolefins produced with a metallocene catalyst as described in U.S. Pat. Nos. 5,322,728 and 5,272,236 which are descriptions are incorporated by referenece herein. Such elastomeric polyolefins are available from Dow Chemical Company under the trademark AFFINITY or ENGAGE (ethylene/octene copolymers) and from Exxon Chemical Company under the trademark EXACT (ethylene/butene copolymers). The metallocene polyolefins have low crystallinity when ethylene is copolymerized with from 8% to 30% by weight of an α-olefin comonomer having from 4 to 12 carbon atoms.

Various tackifying resins can be used in the present invention. In particular, the purpose of the tackifying resin is to provide an elastomeric web that can act as a pressure sensitive adhesive, e.g., to bond the elastomeric sheet to another web or layer of material. Of course, various tackifying resins are known, and are discussed, e.g., in U.S. Pat. Nos. 4,789,699; 4,294,936; and 3,783,072, the contents of which, with respect to the tackifier resins, are incorporated herein by reference. Any tackifier resin can be used which is compatible with the elastomeric polymer and the polyolefin, and can withstand the high processing (e.g., extrusion) temperatures. Generally, hydrogenated hydrocarbon resins are preferred tackifying resins, because of their better temperature stability. The following paragraphs disclose information on three specific tackifying resins, two of which (REGALREZ® and ARKON®P series tackifiers) are examples of hydrogenated hydrocarbon resins, and the ZONATAC®501 lite being a terpene hydrocarbon. Of course, while the three tackifying resins are specifically discussed, the present invention is not limited to use of such three tackifying resins, and other tackifying resins which are compatible with the other components of the composition and can withstand the high processing temperatures, and can achieve the objectives of the present invention, can also be used.

REGALREZ® hydrocarbon resins, a product of Hercules, Incorporated, are fully hydrogenated α-methylstyrene, low molecular weight hydrocarbon resins, produced by polymerization and hydrogenation of pure monomer hydrocarbon feed stocks. Grades 1094, 3102, 6108, and 1126 are highly stable, light-colored low molecular weight, nonpolar resins suggested for use in plastics modification, adhesives, coatings, sealants, and caulks. The resins are compatible with a wide variety of oils; waxes, alkyds, plastics, and elastomers and are soluble in common organic solvents.

ZONATAC®501 lite resin, a product of Arizona Chemical Co., has a softening point of 105° C., a Gardner color (50% in heptane) of 1—and a Gardner color neat (pure) of 2+; (a Gardner color of 1—(50% in heptane) is approximately equal to APHA color=70) a specific gravity (25°/25° C.) of 1.02 and a flash point (closed cup, °F.) of 480° F.

Extending oils which may be used in the extrudable elastomeric composition should be capable of being melt processed with the other components of the extrudable elastomeric composition without degrading. An exemplary extending oil is a white mineral oil available under the trade designation Drakeol 34 from the Pennzoil Company Pennreco Division. Drakeol 34 has a specific gravity of 0.864–0.878 at 60° F., a flash point of 460° F., and viscosity of 370–420 SUS at 100° F. Suitable vegetable oils and animal oils or their derivatives may also be used as the extending oil.

DETAILED DESCRIPTION OF PREFERRED EMBODIMENTS

Extrudable elastic compositions are preferably prepared by blending from 25–75 wt % of one or more hydrogenated thermoplastic elastomeric block copolymers, from 5–35 wt % of a polyphenylene ether, from 15–55 wt % of a polyolefin, from 15–30 wt % of a tackifying resin, and from 0–15 wt % of an extending oil. The addition of PPE to a styrenic block copolymer tends to improve stress relaxation of the block copolymer at temperatures in excess of 30° C. when the amount of PPE ranges from 50 to 200 wt % based on the weight of the polystyrene blocks in the styrenic block copolymer.

As stated previously, while the extrudable elastomeric composition used to form the elastic sheet has been discussed in terms of a five component extrudable composition, the crystalline polyolefin, which functions as a flow promoter for the composition can be substituted by other compatible flow promoters or processing aids, or can be eliminated altogether where the tackifying resin can also act as the flow promoter and/or extending oil. The extending oil, which functions as a processing aid, may also be substituted by other compatible processing aids or can be eliminated altogether where the tackifying resin can also act as the extending oil. For example, low molecular weight hydrocarbon resins such as REGALREZ® tackifier can also act as the viscosity reducer and/or the extending oil, whereby the extrudable composition may contain the elastomeric polymer(s) and the tackifying resin (e.g., REGALREZ® tackifier).

While the principal components of the extrudable elastomeric composition used to form the elastic sheet have been described in the foregoing, such extrudable elastomeric composition is not limited thereto, and can include other composition components not adversely affecting the extrudable elastomeric composition attaining the stated objectives. Exemplary materials which could be used as additional components would include, without limitation, pigments, antioxidants, stabilizers, surfactants, waxes, flow promoters, solvents, particulates, and materials added to enhance processability and pellet handling of the composition.

The term "elastic" is used herein to mean any material which, upon application of a biasing force, is stretchable, that is, elongatable at least about 60 percent (i.e., to a stretched, biased length which is at least about 160 percent of its relaxed unbiased length) and which, will recover at least 55 percent of its elongation upon release of the stretching, elongating force. A hypothetical example would be a one (1) inch sample of a material which is elongatable to at least 1.60 inches and which, upon being elongated to 1.60 inches and released, will recover to a length of not more than 1.27 inches. Many elastic materials may be elongated by much more than 60 percent (i.e., much more than 160 percent of their relaxed length), for example, elongated 100 percent or more, and many of these will recover to substantially their initial relaxed length, for example, to within 105 percent of their initial relaxed length, upon release of the stretching force.

As used herein, the term "stress relaxation" refers to the percent loss of tension or load between the maximum load or force encountered after elongating an elastic material at a specified rate of extension to a predetermined length (or the load or force measured at some initial length) and the remaining load or force measured after the sample has been held at that length for a specified period of time, for example, from about 0 minutes to about 30 minutes. Except where otherwise noted for the present invention, stress relaxation is expressed as a percentage loss of the initial load encountered at a specified extension of an elastic material. The stress relaxation is determined by calculating the difference between the initial maximum load measured after elongating an elastic material at a rate of 20 inches per minute to an elongation of 160 percent (i.e., to 260 percent of the material's initial length) and the remaining load measured after that sample was held at that length for 30 minutes divided by the initial maximum load at that length.

Testing may be performed on an Instron Model 5565 Universal Test Machine using ASTM micro tensile specimens. Stress relaxation after 30 minutes at, for example, an elongation of 160 percent (i.e., to 260 percent of the material's initial length) may be expressed as a percentage utilizing the following equation:

stress relaxation=(peak load$_{160\%}$–load$_{160\%}$ @30 min)/(peak load$_{160\%}$)*100.

As used herein, the term "tensile strength" refers to the resistance of an elastic material to being elongated as determined in accordance with ASTM D-412 using ASTM micro tensile test specimens that are cut from films. Films formed from a blend of an elastomeric block copolymer and other materials such as, for example, a polyphenylene ether, a polyolefin metallocene and/or crystalline, a tackifier, and/or an extending oil were compression molded. Tensile testing may be performed on an Instron Model 5565 Universal Test Machine.

As used herein, the "number average molecular weight" was determined utilizing gel permeation chromatography techniques for linear anionic polymers. All molecular weights are measured prior to hydrogenation which will increase the molecular weights by a small amount.

As used herein, the polystyrene content of a block copolymer refers to the % weight of polystyrene in the block copolymer. It is calculated by dividing the sum of molecular weight of all polystyrene blocks by the total molecular weight of the block copolymer.

COMPARISON EXAMPLES A, B, AND C

In Comparison Examples A, B, and C three different types of elastomers, S-EB-S, S-EP-S, and S-EP-S-EP, were compounded in preferred formulations for making elastomeric fibers or films. In Comparison Example A, the formulation contained 63% by weight of the S-EB-S elastomer, 20% by weight of a polyethylene resin, and 17% by weight of a tackifying resin. In Comparison Example B and C, the formulations contained 68% by weight of the S-EP-S-EP and S-EP-S elastomers, respectively, 12% by weight of a polyethylene resin, and 20% by weight of a tackifying resin. The compositions and properties are shown in Table 1.

Extrudable compositions for each Example were pressed from pellets into films using heat and pressure according to conventional compression molding techniques. The films were cut into ASTM microtensile test specimens. The stress-strain properties of the pressed films were determined in accordance with ASTM D-412 utilizing a Constant Rate of Extension Tester, Instron Model 5565 Universal Testing Instrument. Each sample was placed lengthwise in jaw faces, with a jaw span or separation of 0.75 inches. The Instron Model 5565 Universal Test Instrument crosshead speed was set at 10 inches per minute for the first series of tests measuring the Stress-Strain properties. In addition, stress relaxation was measured using the Instron Model 5565 Universal Test Machine and determined as previously described.

EXAMPLE 1-3

Examples 1, 2, and 3 represent the present invention by replacing a portion of the hydrogenated elastomers in the comparison examples with one of two PPE resins. The elastomers were preblended with the PPE resins by a twin-screw extruder prior to compounding with the remaining components as previously described. The amount of polyphenylene ether resin incorporated in the elastomers prior to subsequent compounding is equal to (100% of) the amount of polystyrene contained in the block copolymer elastomers. The compositions and properties are shown in Table 1 for direct comparison of the benefit in stress relaxation and tensile properties from addition of the PPE resin. The intrinsic viscosities of the PPE resins shown in Table 1 were determined as deciliters per gram as measured in chloroform at 25° C.

TABLE 1

EXAMPLES OF BLEND COMPOSITIONS FOR IMPROVED STRESS RELAXATION AND TENSILE PROPERTIES

| Examples | Comp. Ex. A | Ex. 1 | Comp. Ex. B | Ex. 2 | Comp. Ex. C | Ex. 3 |
|---|---|---|---|---|---|---|
| Compositions, wt % | | | | | | |
| S-EB-S polymer 1) | 63 | 54.8 | | | | |
| PPE polymer 2) | | 8.2 | | | | |
| S-EB-S polymer 3) | | | 68 | 53.7 | | |
| PPE polymer 4) | | | | 14.3 | | |
| S-EB-S polymer 5) | | | | | 68 | 55.8 |
| PPE polymer 4) | | | | | | 12.2 |
| Tackifier 6) | 17 | 17 | 20 | 20 | 20 | 20 |
| Polyethylene 7) | 20 | 20 | 12 | 12 | 12 | 12 |
| Total 8) | 100 | 100 | 100 | 100 | 100 | 100 |
| Melt Flow 190 C./2.16 Kg | 16 | 3.6 | 7 | 2.2 | 6 | 1.7 |
| Mechanical Properties at 23° C. | | | | | | |
| Stress Relax, % | | 32 | 21 | 24 | 20 | 21 |
| 100% modulus, psi | 144 | 180 | 140 | 160 | 175 | 200 |
| 300% modulus, psi | 245 | 260 | 240 | 340 | 286 | 388 |
| 500% modulus, psi | 348 | 400 | 390 | 704 | 466 | 807 |
| Tensile Str., psi | 1189 | 1495 | 1630 | 2530 | 1460 | 2420 |
| Elong. at Break, % | 1075 | 1000 | 1060 | 890 | 890 | 810 |
| Mechanical Properties at 40° C. | | | | | | |
| Stress Relax, % | 56 | 41 | 41 | 30 | 37 | 28 |
| 100% modulus, psi | 118 | 115 | 106 | 153 | 131 | 150 |
| 300% modulus, psi | 165 | 177 | 184 | 300 | 220 | 300 |
| 500% modulus, psi | 228 | 280 | 286 | 570 | 330 | 600 |
| Tensile Str., psi | 435 | 1090 | 795 | 960 | 825 | 1265 |
| Elong. at Break, % | 948 | 1120 | 1050 | 780 | 890 | 750 |

1) Coupled S-EB-S polymer, 13% wt. polystyrene, block sizes: 5200-73100-5200, the polymer contains 30% wt diblock.
2) 0.128 IV PPE resin, 2300 Mn, 5500 Mw, 158° C. Tg.
3) S-EP-S-EP polymer, 21% wt. polystyrene, block sizes 6500-49800-8000-10800.
4) 0.3 IV PPE resin, 9000 Mn, 23000 Mw, 205° C. Tg.
5) S-EP-S polymer, 18% wt. polystyrene, block sizes: 5600-51000-5600.
6) Regalrez 1126 resin manufactured by Herculus Inc.
7) NA 604-001 polyethylene resin manufactured by Quantum Chemical.
8) All include 0.15% wt of Ethanox 330 antioxidant additive.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. An elastomeric composition, comprising:
   from 25% to 75% by weight of a block copolymer having at least two monoalkenyl arene blocks separated by a hydrogenated conjugated diene block;
   from 5% to 35% by weight of a polyphenylene ether having an intrinsic viscosity from 0.09 to 0.35 deciliters per gram as determined in chloroform at 25° C.;
   from 15% to 55% by weight of a polyolefin;
   from 15% to 30% by weight of a tackifying resin; and
   from 0% to 15% by weight of an extending oil.

2. The composition of claim 1, wherein the block copolymer has the structure polystyrene-poly(ethylene-butylene)-polystyrene, polystyrene-poly(ethylene-propylene)-polystyrene, or polystyrene-poly(ethylene-propylene)-polystyrene-poly(ethylene-propylene).

3. The composition of claim 1, wherein the monoalkenyl arene content of the block copolymer is from 13% to 22% and the amount of the polyphenylene ether is from 50% to 200% by weight of the monoalkenyl arene in the block copolymer.

4. The composition of claim 1, wherein the polyphenylene ether is poly-(2,6-dimethyl-1,4-phenylene)ether.

5. The composition of claim 1, wherein the polyolefin is a low density polyethylene, a linear low density polyethylene, a metallocene polyetylene or a combination of these polyolefin resins.

6. An elastomeric composition, comprising:
   from 25% to 75% by weight of a block copolymer having at least two polystyrene blocks separated by a hydrogenated conjugated diene block, wherein the block copolymer has a number average molecular weight from 62,000 to 85,000, each polystyrene block has a number average molecular weight from 5,200 to 8,000;
   from 5% to 35% by weight of a polyphenylene ether having an intrinsic viscosity from 0.09 to 0.35 deciliters per gram as measured in chloroform at 25° C.;
   from 15% to 55% by weight of a polyolefin;
   from 15% to 30% by weight of a tackifying resin; and
   from 0% to 15% by weight of an extending oil.

7. The composition of claim 6, wherein the block copolymer has the structure polystyrene-poly(ethylene-butylene)-polystyrene, polystyrene-poly(ethylene-propylene)-polystyrene, or polystyrene-poly(ethylene-propylene)-polystyrene-poly(ethylene-propylene).

8. The composition of claim 7, wherein the polystyrene content of the block copolymer is from 13% to 22% and the amount of the polyphenylene ether is from 50% to 200% by weight of the polystyrene in the block copolymer.

9. The composition of claim 8, wherein the polyphenylene ether is poly-(2,6-dimethyl-1,4-phenylene)ether having an intrinsic viscosity from 0.09 to 0.350 deciliters per gram as measured in chloroform at 25° C.

10. The composition of claim 9, wherein the polyolefin is a low density polyethylene, a linear low density polyethylene, a metallocene polyetylene or a combination of these polyolefin resins.

* * * * *